United States Patent
Mazzarolo et al.

(10) Patent No.: US 10,300,975 B2
(45) Date of Patent: May 28, 2019

(54) PROTECTIVE GARMENT PROVIDED WITH AN INFLATABLE PROTECTIVE DEVICE AND ASSOCIATED INFLATING METHOD

(71) Applicant: Alpinestars Research SRL, Coste di Maser (Treviso) (IT)

(72) Inventors: Giovanni Mazzarolo, Coste di Maser (IT); Colin Ballantyne, Asolo (IT)

(73) Assignee: ALPINESTARS RESEARCH SRL, Coste di Maser (Treviso) (IT)

( * ) Notice: Subject to any disclaimer, the term of this patent is extended or adjusted under 35 U.S.C. 154(b) by 192 days.

(21) Appl. No.: 15/327,474

(22) PCT Filed: Jul. 17, 2015

(86) PCT No.: PCT/EP2015/066395
§ 371 (c)(1),
(2) Date: Jan. 19, 2017

(87) PCT Pub. No.: WO2016/012359
PCT Pub. Date: Jan. 28, 2016

(65) Prior Publication Data
US 2017/0202279 A1  Jul. 20, 2017

(30) Foreign Application Priority Data

Jul. 22, 2014  (IT) .............................. TV2014A0109

(51) Int. Cl.
*B62J 27/00* (2006.01)
*A41D 13/018* (2006.01)
(Continued)

(52) U.S. Cl.
CPC .............. *B62J 27/00* (2013.01); *A41D 1/002* (2013.01); *A41D 13/018* (2013.01); *G05B 15/02* (2013.01);
(Continued)

(58) Field of Classification Search
CPC ............ A41D 13/018; A41D 2600/102; A61B 5/1117; B60R 2021/0088; B62J 27/00
See application file for complete search history.

(56) References Cited

U.S. PATENT DOCUMENTS 4,977,623 A * 12/1990 DeMarco ............. A41D 13/018
 2/456
7,740,272 B2 * 6/2010 Goto ........................ B62J 27/00
 280/728.1
(Continued)

FOREIGN PATENT DOCUMENTS

WO          02054895 A2    7/2002
WO        2014001189 A1    1/2014
WO    WO-2015183470 A2 * 12/2015  ............. A42B 3/046

OTHER PUBLICATIONS

PCT International Search Report and Written Opinion dated Oct. 7, 2015 for Intl. App. No. PCT/EP2015/066395, from which the instant application is based, 8 pgs.

*Primary Examiner* — Ruth Ilan
(74) *Attorney, Agent, or Firm* — Fredrikson & Byron, P.A.

(57) ABSTRACT

The present invention relates to a protective garment (10, 110) provided with an inflatable protective device. The inflatable protective device comprises: at least one inflatable bag (12), suitable for moving between a rest condition, wherein it is in a deflated status, and an operating condition, wherein it is in an inflated status; an inflator device (14) coupled to the at least one inflatable bag (12) and designed for inflating the at least one inflatable bag (12), once the inflator device (14) is triggered; at least one acceleration sensor (16) suitable for detecting the acceleration undergone by the garment (10, 110) and a control unit (18) designed for processing the acceleration data detected by the at least one acceleration sensor (16) and for sending a triggering signal (Continued)

to the inflator device (14), when a crash situation is identified. The protective garment is characterized by further comprising a transmitting unit (20), (120) designed for sending an activation signal (15) outside the protective garment (10, 110) when the triggering signal is generated by the control unit 18 and a receiving unit (21, 121) suitable for receiving a signal (15) from outside the protective garment (10, 110) and generating the triggering signal of the inflator device (14) when the received signal (15) is recognized as an activation signal. The present invention also relates to a method for inflating an inflatable protective device of a protective garment.

18 Claims, 6 Drawing Sheets

(51) Int. Cl.
  *A41D 1/00* (2018.01)
  *G05B 15/02* (2006.01)
  *B60R 21/00* (2006.01)
(52) U.S. Cl.
  CPC  *A41D 2600/102* (2013.01); *B60R 2021/0088* (2013.01)

(56)  References Cited

U.S. PATENT DOCUMENTS

| | | |
|---|---|---|
| 8,348,304 B2 | 1/2013 | Kojima et al. |
| 9,125,439 B2* | 9/2015 | Brandolese .......... B60R 21/0132 |
| 9,505,366 B2* | 11/2016 | Savaresi .............. B60R 21/0132 |
| 9,730,482 B2* | 8/2017 | Allen .................... A42B 3/0486 |
| 2002/0113417 A1* | 8/2002 | Mattes ................. A41D 13/018 |
| | | 280/730.1 |
| 2004/0111790 A1 | 6/2004 | Dainese |
| 2007/0075528 A1* | 4/2007 | Makabe .............. A41D 13/018 |
| | | 280/730.1 |
| 2007/0147272 A1* | 6/2007 | Mazzarolo ........... A41D 13/018 |
| | | 370/280 |
| 2008/0238056 A1* | 10/2008 | Kobayashi ........... A41D 13/018 |
| | | 280/735 |
| 2009/0055053 A1* | 2/2009 | Carmeli .............. B60R 21/0132 |
| | | 701/45 |
| 2009/0127835 A1* | 5/2009 | Lin ....................... A41D 13/018 |
| | | 280/730.1 |
| 2009/0254003 A1* | 10/2009 | Buckman .............. A61B 5/1117 |
| | | 600/595 |
| 2011/0237194 A1* | 9/2011 | Kojima ................ A41D 13/018 |
| | | 455/41.3 |
| 2012/0131718 A1 | 5/2012 | Uchida |
| 2014/0033413 A1* | 2/2014 | Briggs .................. A41D 13/00 |
| | | 2/466 |
| 2014/0125450 A1* | 5/2014 | Brandolese ......... B60R 21/0132 |
| | | 340/3.1 |
| 2016/0174626 A1* | 6/2016 | Mazzarolo ........... A41D 13/018 |
| | | 2/455 |
| 2017/0181485 A1* | 6/2017 | Jin ........................ A61B 5/1117 |
| 2017/0202279 A1* | 7/2017 | Mazzarolo ........... A41D 13/018 |
| 2017/0224031 A1* | 8/2017 | Raanan ................ A41D 13/018 |

* cited by examiner

PROTECTIVE GARMENT PROVIDED WITH AN INFLATABLE PROTECTIVE DEVICE AND ASSOCIATED INFLATING METHOD

RELATED APPLICATIONS

This application is a 35 U.S.C. 371 national stage filing from International Application No. PCT/EP2015/066395, filed Jul. 17, 2015, which claims priority to Italian Application No. TV2014A000109, filed Jul. 22 2014, the teachings of which are incorporated herein by reference.

FIELD OF THE INVENTION

The present invention relates to a protective garment provided with an inflatable protective device. In particular the present invention refers, even if in a non exclusive way, to a protective garment provided with an inflatable protective device suitable for being worn by a motorcyclist.

Moreover, the present invention relates to a method for inflating an inflatable protective device of a protective garment.

BACKGROUND

It is well known that the safety of motorcyclists is an ongoing concern. Over the years a large number of products, created for reducing the risk of injuries in an accident, have been introduced in the market.

For reducing the risk of injuries, the motorcyclists usually wear protective garments made with materials resistant to abrasion, like leather or synthetic material. Such garments might be provided in some areas, for example in the region of the shoulders, the knees, and the back, with rigid or semi-rigid protection elements designed for limiting impact forces.

Recently the protection offered by said protective garments has been improved by integrating inflatable protective devices into the structure of the abrasion resistant garment.

Such inflatable protective devices are designed for being inflated as soon as a crash situation is detected so as to offer an additional protection to the motorcyclist.

Currently two methods are mainly used for detecting a crash situation so as to quickly inflate the inflatable protective device integrated in the garment.

The first method is disclosed in PCT patent application WO 02/054895 wherein an inflatable protective device, triggered by means of a cable that connects the garment worn by the user with the motorcycle, is disclosed. Should the motorcyclist be thrown from or fall off of the motorcycle the resulting force applied to the triggering cable is transmitted to the inflating cartridge of the protective device for releasing the gas that inflates the protective bladders.

The second method is disclosed in U.S. Pat. No. 8,348, 304. Such US patent shows an airbag jacket activating system including a motorcycle and an airbag jacket worn by the rider of the motorcycle.

The system comprises an ECU (electronic control unit), mounted on the rear part of the motorcycle, suitable for controlling the inflator of the inflatable air chambers provided on the jacket.

The ECU, on the basis of the acceleration detected by an acceleration sensor mounted on the motorcycle, is able to judge whether the airbag jacket worn by the user should be deployed. Subsequently, the ECU transmits an ignition signal to a transceiver mounted on the airbag jacket so as to activate the activation device of the inflator.

A third method has been recently proposed. According to this method, that is disclosed in the PCT patent application WO 2014/001189, the garment is provided with a triggering device mounted directly on the garment. The triggering device does not require the provision of a triggering cable nor require the provision of electronic sensors on the motorcycle. Advantageously, in this case, the freedom of movement of the motorcyclist is not hindered by the presence of a triggering cable. At the same time, the motorcyclist does not need to install any equipment on his motorcycle beforehand, making the protective system cheaper and simpler.

All of the above patents/patent applications do not face the problem of how the corresponding systems should be integrated when there are two people travelling on the motorcycle.

The first and third method above disclosed assume that the rider and passenger will purchase and wear duplicate systems. This means that in the event of an accident the person who is closest to the impact will have his garment inflated first. For example if the motorcycle hits a car in front the rider airbag will inflated first, and passenger second. However if the motorcycle is hit from behind by a car then the passenger airbag will be inflated first and the rider airbag will be inflated second.

The second method above disclosed in theory might envisage the use of an ECU suitable for activating, with only one signal, at the same time the garment of the rider and the garment of the passenger. However, the drawback of this method is that the acceleration sensors are positioned on the motorcycle. Therefore, the garments of the rider and passenger are not stand-alone devices suitable for being used in cooperation with different motorcycle.

Moreover this method discloses the use of a single acceleration sensor positioned on the rear portion of the motorcycle. A single location of the acceleration sensor on the motorcycle could give a delayed deployment of the protection system if the motorcycle is hit on the front portion.

Furthermore, since passenger and rider are not rigidly engaged on the motorcycle, it is not assured that the acceleration detected by sensor mounted on the motorcycle is sufficiently indicative of the necessity to inflate the airbag in the protective garment, i.e. that the true acceleration of the passenger or the rider is dangerous.

BRIEF SUMMARY OF EMBODIMENTS OF THE INVENTION

The object of the present invention is to provide a protective garment provided with an inflatable protective device which solves at least partially the above mentioned problems and drawbacks.

In particular, an aim of the present invention is to provide a protective garment provided with an inflatable protective device having a reduced triggering time, once a crash is detected.

Moreover, an aim of the present invention is to provide a protective garment provided with an inflatable protective device which is able to offer a higher protection to a user without needing to be connected to any external devices.

A further aim of the present invention is to provide a protective garment provided with an inflatable protective device having a construction that does not reduce the freedom of movement of the user.

Another aim of the present invention is to provide a protective garment provided with an inflatable protective device suitable for being worn, without adjustments, by the rider and/or by the passenger of a motorcycle.

These and other objects and aim are achieved by the protective garment and the method according to claims hereof.

BRIEF DESCRIPTIONS OF DRAWINGS

The advantages and the characteristic features of the invention will appear more clearly from the following description of a preferred, but not exclusive, embodiment of the protective garment with reference to the accompanying figures in which.

DETAILED DESCRIPTION OF EMBODIMENTS OF THE INVENTION

Figure 1:
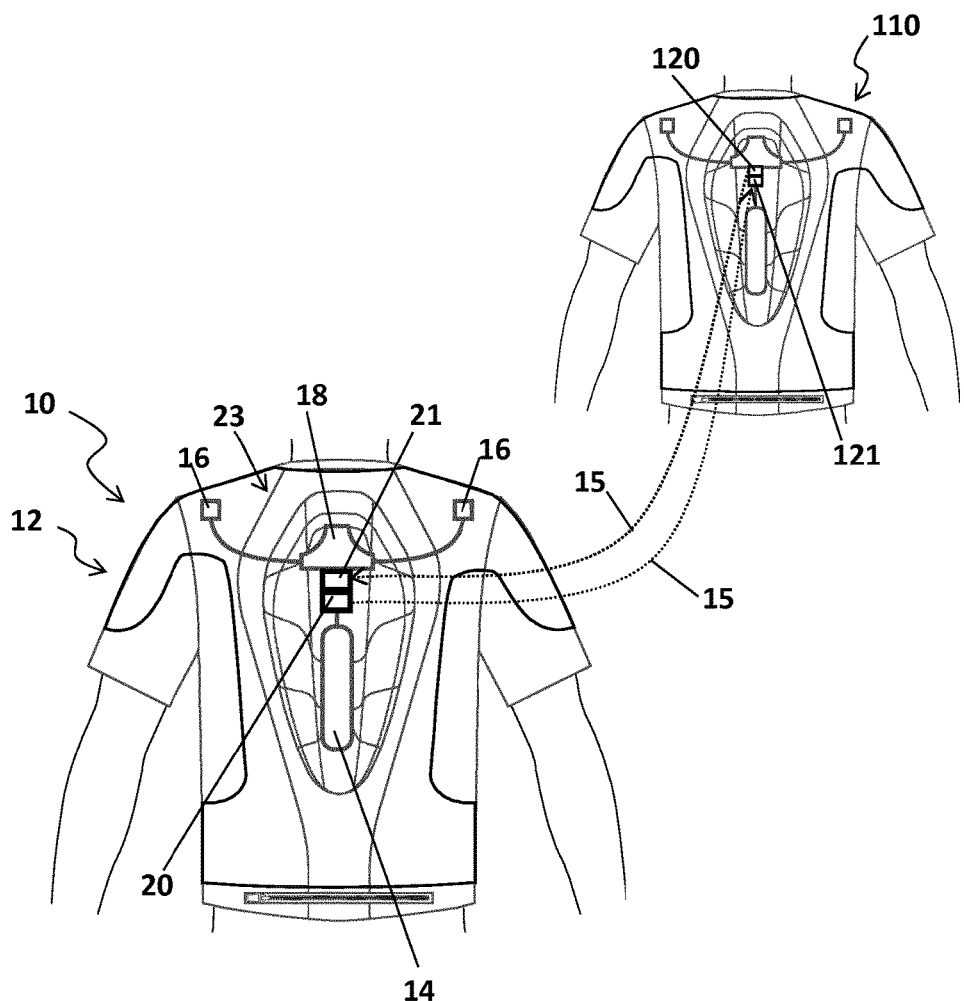
FIG. 1 shows a schematic rear view of a protective garment according to the invention.

A possible embodiment of a garment 10 according to the invention is shown in FIG. 1. It should be noted that even if a vest-garment is illustrated in FIG. 1, the garment of the present invention could be a one piece bodysuit, a jacket, trousers or other similar garments.

Figure 2:
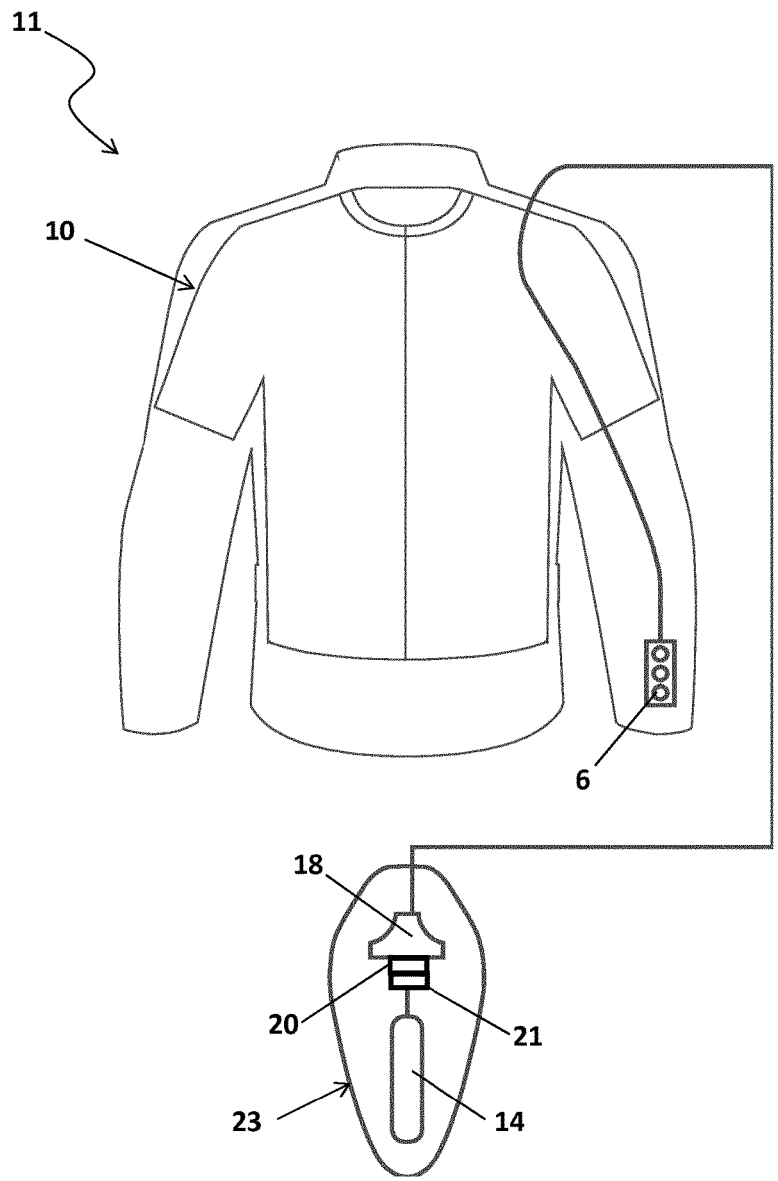
FIG. 2 shows a schematic front view of an outer jacket into which the protective garment of FIG. 1 may be installed.

As shown in FIG. 2 the garment 10 might be worn under a further protective garment 11. Alternatively the garment 10 might be worn on top of a further protective garment. Advantageously, as it is well known in the art, the garment 10 might be provided with additional protective elements, not shown in the attached figures, such as for example elbow protectors, shoulder protectors, back protector, so as to be suitable for being worn alone.

The protective garment 10 is designed for being used in particular by motorcyclists. Nevertheless, as it will appear more clearly from the following description, the protective garment 10 can also be advantageously used by cyclists or in other fields where an effective protection of the user's body must be obtained.

According to the invention, the garment 10 comprises at least one inflatable bag 12 suitable for moving between a rest condition, wherein it is in a deflated status, and an operating condition, wherein it is in an inflated status.

In the embodiment shown in FIG. 1, the protective garment 10 is provided with a single inflatable bag 12 designed for protecting the chest, back and shoulders of the user. However, the garment 10 might be provided with a single inflatable bag or a plurality of inflatable bags suitable for covering different areas of the user's body.

The garment 10 also comprises an inflator device 14 which is coupled to the inflatable bag 12. The inflator device 14 is designed, once it is triggered, for inflating the inflatable bag 12.

Preferably, the inflator device 14 is a pyrotechnically activated cold gas inflator. Alternatively, the inflator device 14 might be a hot gas, hybrid, or purely cold gas inflator.

The garment 10 further comprises at least one acceleration sensor 16 suitable for detecting the acceleration undergone by the garment.

In the embodiment of FIG. 1, two acceleration sensors 16, positioned at the shoulders area, are shown. Obviously, any number of acceleration sensors 16 can be used. Moreover, the acceleration sensors 16 might be arranged at different area of the garment.

Preferably, the acceleration sensors 16 are integrated in the garment 10, where normally it is not possible to remove the sensors 16 without damaging the garment. Alternatively, the sensors 16 might be removably fixed to the garment, for example by means of clips or other suitable releasable fixing means.

The garment 10 also comprises a control unit 18 designed for processing the acceleration data detected by the acceleration sensors 16. The control unit 18 is suitable for sending a triggering signal to the inflator device 14 when a crash/dangerous situation is detected. As a crash/dangerous situation it should be intended a situation when the protective garment 10 undergone a sudden acceleration or deceleration. In particular, when the user of the garment 10 is on a vehicle, like for example a motorcycle, a sudden acceleration or deceleration undergone by the garment 10 will identify for example that the motorcycle has hit an obstacle or that the user has lost the control of the motorcycle being thrown from the saddle.

The acceleration sensors 16 might be connected to the control unit 18 by means of wired and/or wireless connections.

The control unit 18 is designed for processing at regular time intervals (for example of 2 ms) the data received by the acceleration sensors 16 so as to obtain an information about the movements of the user and the forces acting on the garment.

If the control unit 18 detects, on the basis of an algorithm implemented in the control unit, that a crash situation is occurring, a triggering signal is sent from the control unit 18 to the inflator device 14 so that the inflatable bags 12 can be inflated.

In this way, in case of an accident, the inflated bags 12 can offer to the user an additional protection.

According to the present invention, the garment 10 further comprises a transmitting unit 20 and a receiving unit 21.

The transmitting unit 20 is designed for sending an activation signal 15 outside the protective garment 10 when the triggering signal is generated by the control unit 18. Preferably, the activation signal can be a codified activation signal, so that a higher safety operation is assured, as clarified below.

Figure 4:
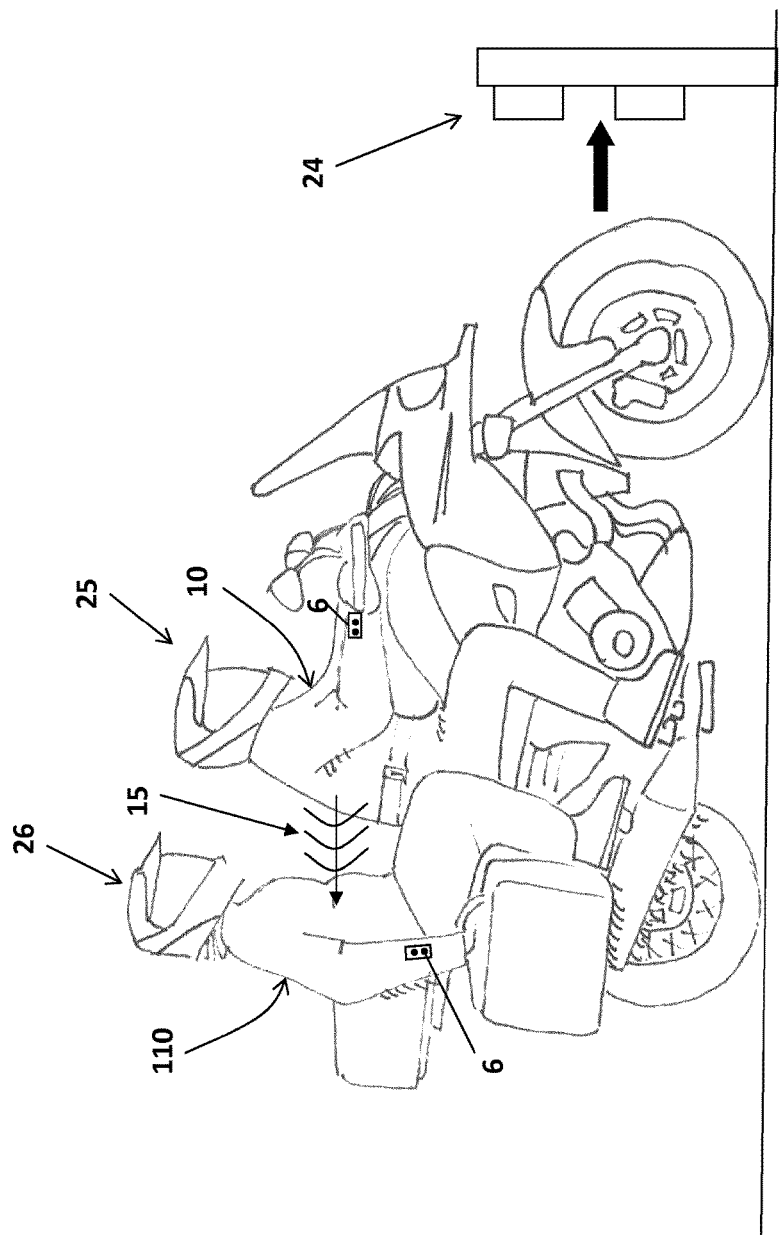
FIG. 4 shows a schematic view of a motorcycle with two people on board subject to a frontal impact.
Figure 5:
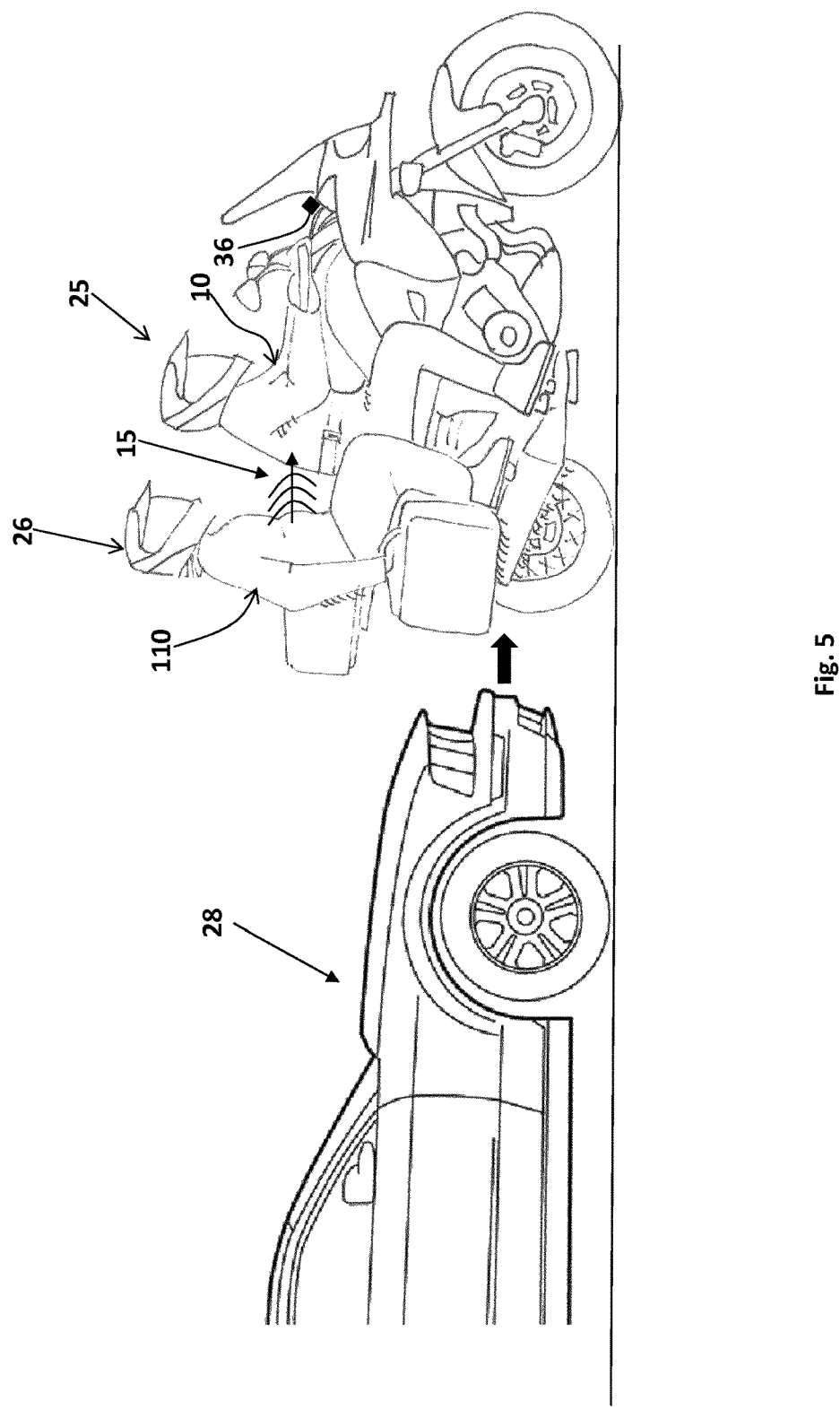
FIG. 5 shows a schematic view of a motorcycle with two people on board subject to a rear impact.

The receiving unit 21 is suitable for receiving an activation signal 15 from outside the protective garment 10 and for generating the triggering signal of the inflator device 14, when an activation signal 15 is received (see FIGS. 1, 4 and 5). If the activation signal transmitted by the transmitting unit is codified, the receiving unit is adapted to decode the signal received, as clarified below.

As it will be explained in greater detail in the following, thanks to the provision of the above mentioned transmitting unit 20, if a crash situation is detected by the control unit 18, it is possible to trigger a second inflatable protective device positioned in proximity of the garment 10. As a matter of fact, it is only needed that such second inflatable device is provided with a receiving unit able to process the codified or not codified activation signal 15 for generating a triggering signal, thereby allowing the inflation of the second inflatable protective device.

At the same time, thanks to the provision of the receiving unit 21, it will be possible to trigger the inflator device 14 not only on the basis of a triggering signal generated by the control unit 18, but also on the basis of a valid activation signal 15 received for example from a second protective device worn in close proximity of the garment 10. Usually, a received signal is a valid activation signal when it is recognised by the receiving protective garment as a signal adapted to activate the inflatable protective device.

Advantageously, when the transmitting unit 20 of the garment emits the activation signal 15, the receiving unit 21 of the garment is deactivated or the activation signal received is recognised as own and disregarded, so that the signal emitted by the transmitting unit 20 cannot interfere with the operation of the protective garment itself.

As it is schematically shown in FIGS. 1 and 2, the control unit 18, the transmitting unit 20, the receiving unit 21 and the inflator device 14 might be housed inside a back protector 23. Also one or more of the acceleration sensors 16 can be housed inside the back protector 23.

The back protector 23 is designed for protecting, when the garment 10 is in use, the back portion of the user. The back protector 23 can be integrated in the garment 10. Alternatively, the back protector 23 can be removably fixed to the garment 10 by means of straps, for example by means of an abdominal strap. Such fixing means are not shown in the attached figures being well known to the skilled person.

As it is shown in FIG. 2, in case the garment 10 is worn underneath a further garment 11, the latter might be provided with a display 6. Preferably such display 6 is mounted at the arm portion of the further garment 11. Also in case the protective garment 10 is designed for being worn alone, it might be provided with a display 6. Preferably such display 6 may be arranged at the arm portion of the garment 10 (see FIG. 4).

Through the display 6 the user might receive information about the status of the inflatable protective device of the garment 10.

Moreover, in case the inner garment 10 should be connected to the outer garment 11, the user might also verify through the display 6 whether the inner garment 10 is correctly connected to the outer garment 11.

Transmitting unit 20 and receiving unit 21 can be designed for respectively sending outside the garment 10 and for receiving from outside the garment 10 a codified activation signal through a wireless transmission. For example, the wireless transmission can be carried out by using an electromagnetic propagation, as a radio propagation or an optical propagation.

Also a proper well-known communication protocol can be used.

For example, transmitting unit 20 and receiving unit 21 may communicate with external devices using radio communication protocol as the Bluetooth protocol or WIFI protocol or other similar protocols. Advantageously, also an infrared communication protocol might be used, as IrDA protocol.

Alternatively, considering that, as it will be explained in the following, the aim of the present invention is to allow the pairing of an inflatable protective device of a garment worn by the rider of a motorcycle with an inflatable protective device of a garment worn by the passenger of the same motorcycle, also a wireless protocol suitable for operating at shorter distance, such as for example the near field communication (NFC) might be used.

Alternatively, the transmitting unit 20 and receiving unit 21 might communicate with external devices through wired communication link, namely by connecting the transmitting unit 20 and the receiving unit 21 with external devices through physical connections.

In this case, the transmitting unit 20 and the receiving unit 21 are preferably provided with connection slots for receiving the connecting cables.

Figure 3:
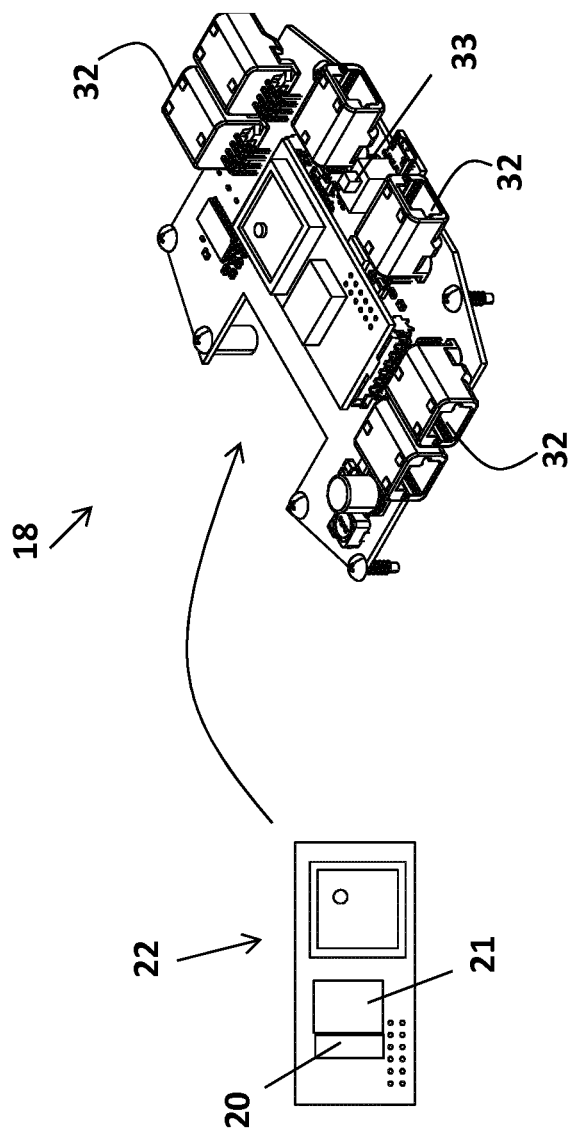
FIG. 3 shows a schematic view of an electronic unit of the garment according to the invention.

As it is schematically shown in FIG. 3, transmitting unit 20 and receiving unit 21 may be supplied each as a separate component of the control unit 18. Preferably, transmitting unit 20 and receiving unit 21 may be incorporated in an expansion board 22. For example, such expansion board 22 may be inserted in a seat provided in the control unit 18.

In case the transmitting unit 20 and receiving unit 21 are incorporated in an expansion board 22 inserted in the control unit 18, preferably the connection slots for receiving the connecting cables are provided in the control unit 18. See for example FIG. 3 wherein such slots are indicated by the reference number 32.

Alternatively, the expansion board 22 may be directly fixed to the garment. In this way the transmitting unit 20 and receiving unit 21 may be purchased in isolation and installed at a later date on a compatible garment for providing their additional functionality.

In a different embodiment the transmitting unit 20 and the receiving unit 21 may be directly incorporated in the control unit 18.

The transmitting unit 20 and the receiving unit 21 may be provided with an on-off switch suitable for being operated by the user. Therefore, in case the garment 10 does not have to be paired with external devices, the transmitting unit 20 and the receiving unit 21 might be turned off by switching off said on-off switch. In this case, if a crash situation has been detected by the control unit 18, no activation signal will be sent by the transmitting unit 20 to outside the garment 10. At the same time, the receiving unit 21 will not be able to receive an activation signal emitted by outside the garment 10.

Advantageously, in case the garment 10 does not have to be paired with external devices, by turning off the transmitting unit and the receiving unit the energy consumption of the electronic components of the garment will be reduced. Such operation mode can be used when the rider is alone on the motorcycle. As a matter of fact, the control unit 18 might work independently from the transmitting unit and the receiving unit. Therefore the control unit 18 is still able to identify a crash situation and to send a triggering signal to the inflator device 14, without reducing the protection offered by the garment 10 to the user.

Similarly, also the control unit 18 might be provided with an on-off switch 33 (see FIG. 3). Advantageously, in this case the control unit 18 might be turned off when the garment 10 is not used.

Advantageously, according to the invention, the inflatable protective device of a protective garment 10 worn by the rider of a motorcycle may be paired with the inflatable protective device of a protective garment worn by the passenger of the motorcycle and vice-versa, so that only the paired protective garments can activate each other.

For example, the transmitting unit 20 and the receiving unit 21 can be suitable for being respectively paired with a receiving unit 121 and a transmitting unit 120 provided on the second garment 110 (see FIG. 1).

In order to perform the pairing operation in a safe mode, the protective garment 10 may also include a storage memory for storing an identification code of the inflatable protective device mounted on the garment. Advantageously, the identification code may be univocal for each garment or for each pair of garments.

The garment 10 will be paired only with external devices having the same identification code or having a corresponding stored identification code. In this way, accidental activations of the inflatable protective device of the garment 10 will be prevented. The pairing operation between two protective garments may be similar to a pairing operation between two devices as defined by the specific transmission protocol that is used.

The pairing operation with external devices may be automatically initialized.

In this case, the garment will be automatically paired with compatible external devices, positioned within the operating range of transmitting and receiving units, having the same identification code, or with a differing code that the unit had been instructed to pair with on a previous occasion.

Alternatively, the pairing operation may be manually initialized.

For example, the user can start the pairing operation by selecting an icon or a menu on the display 6 or by pressing a specific button or key provided on the garment. Alternatively, the user may start the pairing operation by using a specific application of a smartphone suitable for communicating with an external device.

Preferably, in this case, the smartphone of the user of the garment 10 will be able to communicate at the same time with the external device and with the control unit 18.

A way of coupling one protective garment to an other protective garment is by a "teaching procedure". The two garments are placed next to each other and the teaching procedure is initiated by press a teaching button in the first protective garment and a learning button in the second protective garment. The "teaching" garment sends an identification code by the transmitting unit and the "learning" garment receives the code and stores it in the internal memory as identification code of the pair. In the normal operation, each garment accepts as valid activation signals only signals which contain the identification code exchanged in the teaching procedure.

Advantageously, the teaching button and the learning button on each garment can be a singular "pairing" button. In this case, when the pairing button is pressed, the control unit of the garment listens for a signal for the receiving unit for a prearranged time period. If no signal with an identification code is detected in this time period the control unit commands the transmitting unit to emit the identification code for teaching it to another garment. However, if a signal with an identification code is received during the above mentioned time period the control unit stores it in the memory as identification code of the pair.

In this way, when two garments have to be coupled, the garment on which the pairing button is pressed firstly teaches the identification code to the other garment and there is no need to press any other button.

In any case, if the garment 10 is provided with an outer display or if the garment 10 is worn underneath a further garment provided with an outer display 6, a led or an icon provided on the display may advantageously inform the user that a pairing operation has been successfully completed.

Advantageously, the garment 10 or the transmitting unit 20 and the receiving unit 21 of the garment 10 may be paired with more than one external device.

For example, the garment 10 (or the transmitting unit 20) may be paired with a second garment 110 (or a receiving unit 121 of a second garment 110) in close proximity of the garment 10 and with a receiving unit mounted on or comprised in a smartphone of the user.

Alternatively, in case the user of the protective garment 10 is riding a motorcycle, the garment 10 may also be paired, in addition to the second garment 110, with a receiving unit 36 provided on the motorcycle used by the garment's user. For example, the receiving unit 36 provided on the motorcycle may be a display mounted on the dashboard of the motorcycle.

In a further embodiment, the garment may be paired at the same time with receiving units mounted respectively on a smartphone and on the motorcycle.

The same applies for the garment 10 that, for example, can be paired with a corresponding transmitting unit provided on a smartphone and/or on a motorcycle.

Advantageously, by pairing the garment 10 with corresponding external devices it will be possible to duplicate on such external devices the diagnostic information concerning the status of the protective garment 10 normally communicated on the display 6 of the garment.

For example, it will be possible to duplicate the diagnostic information of the garment 10 directly on the receiving unit 36 mounted on the dashboard of the motorcycle where it may be more easily seen by the user. In this way it will be possible to view diagnostic information about the garment on the motorcycle.

The identification code may be a "bidirectional" code, i.e. both garments of the pair send the same identification code, or a "monodirectional" code, i.e. each garment of the pair sends its identification code, which is exchanged and stored in the storage memory of the other garment of the pair during the teaching procedure, so that the identification code is recognised when received.

Moreover, the identification code may be codified or encrypted in the activation signal for increasing the protection against wrong activation, for example caused by signals that are not sent by the other garment of the pair.

As anticipated the present invention also relates to a method for inflating an inflatable protective device 12, for example an inflatable bag 12, of a protective garment 10, 110.

The method comprises the following steps:
detecting the acceleration undergone by the protective garment 10, 110;
processing, for identifying a dangerous or crash situation for the user of the protective garment 10, 110, the detected acceleration data;
generating a triggering signal when a dangerous or crash situation has been identified so as to inflate the inflatable protective device 12 of the protective garment 10, 110.

According to the invention the method further comprises the following steps:
sending a activation signal 15 outside the protective garment 10, 110 when the triggering signal is generated; and
automatically monitoring signals received from outside the protective garment 10, 110 for generating a triggering signal of the inflatable protective device 12 when an activation signal is received.

Preferably, the method according to the invention also comprises the step of providing the protective garment 10, 110 with an identification code. In view of the above, the triggering signal will be generated only if the signal received from outside the garment 10 is compatible with the identification code.

Moreover, the method according to the invention also comprises the step of pairing the protective garment 10 with a further protective garment 110 worn in close proximity.

Advantageously, the step of pairing the protective garment 10 with a further protective garment 110 may be automatically initialized.

Alternatively, such step of pairing the protective garment 10 with a further protective garment 110 may be manually initialized.

Preferably, the method of the present invention comprises also the step of detecting the acceleration undergone by a vehicle on which the user of the protective garment 10, 110 is mounted. In this way, for identifying a dangerous situation, in addition to the acceleration data of the garment also the acceleration data of the vehicle, for example a motorcycle, will be processed.

Figure 6:
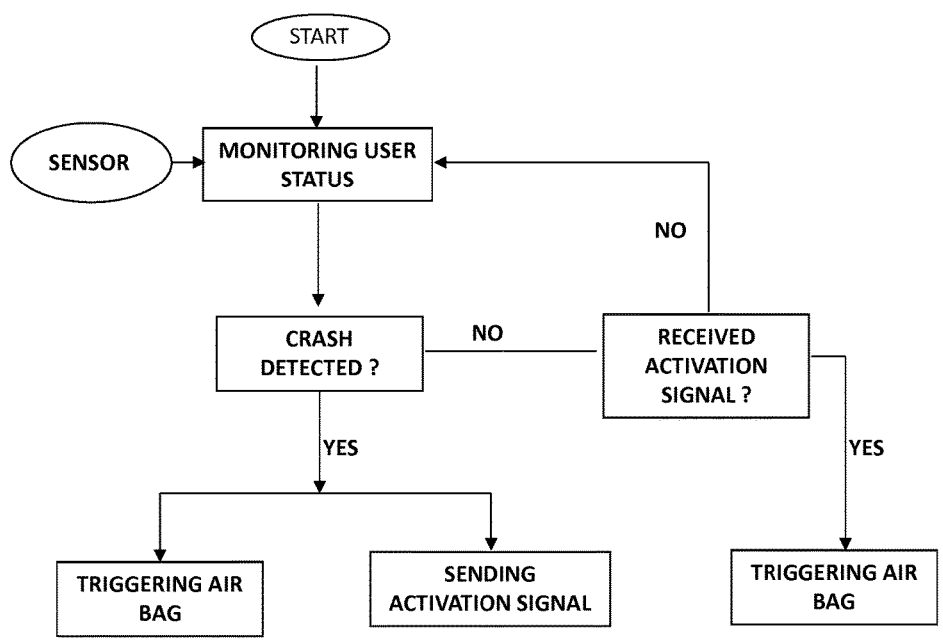
FIG. 6 shows an example of flow chart of the base logic of the activation of the protective device of the garment.

With specific reference to FIGS. 4-6, the operation of the protective garment 10 will be disclosed. It is assumed that the protective garment 10 is worn by a rider of a motorcycle and that the transmitting unit 20 and the receiving unit 21 are suitable for communicating with external devices through a wireless communication protocol.

If the control unit 18 is provided with an on-off switch 33, the rider preliminarily should turn on the control unit 18.

If the protective garment 10 should not be paired with any external device, namely for example if the rider is the only one person on the motorcycle, the operation of the protective garment 10 is similar to the known protective garments provided with inflatable protective devices.

Therefore, the control unit 18 will monitor the status of the rider by processing the data detected by the acceleration sensors 16. If a crash situation is detected, the control unit 18 will immediately send a triggering signal to the inflator device 14 that in its turn will inflate the inflatable bags 12.

If there are two persons travelling on the motorcycle and both the rider and the passenger are wearing the protective garment of the present invention, advantageously it will be possible to pair the protective garment 10 worn by the rider 25 with the protective garment 110 worn by the passenger 26.

As a matter of fact, as above mentioned, it will be possible to pair the rider's garment 10 (or the transmitting unit 20 of the rider's garment 10) with the passenger's garment 110 (or the receiving unit 121 of the passenger's garment 110) and vice-versa.

It should be noted that such pairing operation will be finalized only in case the identification code in the protective garment 10 worn by the rider 25 is compatible with the identification code in the protective garment 110 worn by the passenger 26.

It is well known that a motorcycle may be subject to a variety of accidents.

As it is shown in FIG. 4, a first possible crash situation occurs when the motorcycle is moving forward and hits an obstacle 24, such as a roadside barrier or another vehicle, by knocking against it with the front tyre. The deceleration caused by such collision originates from the front tyre and then it starts to travel towards the tail of the motorcycle. The garment 10 of the rider 25 will sense this deceleration first and this will cause the triggering, by means of the control unit 18, of the inflator device 14.

As also shown in FIG. 6, if the garment 10 of the rider 25 is paired with the garment 110 of the passenger 26, a valid activation signal 15 will be sent by the transmitting unit 20 of the garment 10 to the receiving unit 121 of the garment 110. The receiving unit 121 in its turn will generate a triggering signal for the coupled inflator device so as to cause an almost simultaneous inflation of the inflatable bags provided on the garment 110 worn by the passenger 26.

Therefore, the inflatable bag of the passenger's garment 26 will be inflated before that the corresponding control unit detects a crash situation.

Similarly as it is shown in FIG. 5, a different possible crash situation for the motorcycle is when the motorcycle is hit from behind by another vehicle 28, like a car or a motorcycle.

In this case an acceleration pulse will travel from the back of the vehicle to the front. In this case thus the control unit of the garment 110 worn by the passenger 26 will detect this deceleration first, by sending a triggering signal to the coupled inflator device so as to inflate the inflatable bag of the garment 110 worn by the passenger.

At the same time, the transmitting unit 120 of the garment 110 will send a valid activation signal 15 to the receiving unit 21 of the garment 10 worn by the rider 25. Following to such activation signal 15, the receiving unit 21 will generate a triggering signal for the inflator device 14 so as to immediately inflate the inflatable bag 12 (see FIG. 6).

By operating as above mentioned, the garment of the present invention allows to substantially equalise the deployment times of the inflatable protective device provided on the garments worn respectively by the rider 25 and by the passenger 26.

In this way, it is possible to anticipate of a time interval of between 20 to 50 ms the activation of the inflatable protective device which would normally be activated for second.

In view of the above, it is now clear how the present invention allows achieving the above mentioned objects.

As a matter of fact, in case of a front accident of a motorcycle, the triggering time of the inflatable protective device of the garment worn by the passenger will be reduced. At the same time, in case of a rear impact, the triggering time of the inflatable protective device of the garment worn by the rider will be reduced.

Consequently, the garment of the present invention being able to be inflated in a reduced time offers a higher protection to the user without needing to be connected to any external devices. As a matter of fact, all the electronic components are provided on the garment. Only in case the transmitting unit and the receiving unit are designed for communicating with external devices through a wired communication protocol, a physical connection will be present between them. However, considering that the rider and passenger, when they are in saddle of the motorcycle, are in close proximity to each other, such connecting cables do not hinder their movements.

Moreover, the provision of a transmitting unit and of a receiving unit on the garment does not make the latter bulky and therefore does not reduce the freedom of movement of the user.

Furthermore, the garment of the present invention might be worn, without adjustments, by the rider and/or the passenger of a motorcycle. As a matter of fact, the operating logic is the same in both cases.

Obviously, the above description of an embodiment applying the innovative principles of the present invention is provided by way of example of these innovative principles and must therefore not be regarded as limiting the scope of the rights claimed herein.

For example the acceleration sensors 16 might be also provided on the motorcycle. In this case, the data detected by such sensors may be transmitted to the control unit 18 for supplementing the data already detected from the acceleration sensors provided on the garment and/or on the back protector.

The invention claimed is:

1. A protective garment (10, 110) provided with an inflatable protective device, comprising:
    at least one inflatable bag (12) configured for being moved between a rest condition, wherein the at least one inflatable bag is in a deflated status, and an operating condition, wherein the at least one inflatable bag is in an inflated status;
    an inflator device (14) coupled to the at least one inflatable bag (12) and configured for inflating the at least one inflatable bag (12) in event of the inflator device (14) being triggered;
    at least one acceleration sensor (16) configured for detecting acceleration undergone by the protective garment (10, 110);
    a control unit (18) configured for processing acceleration data detected by the at least one acceleration sensor (16) and for sending a triggering signal to the inflator device (14) in event of a crash situation being identified;
    a transmitting unit (20, 120) configured for sending an activation signal (15) outside the protective garment (10, 110) in event of the triggering signal being generated by the control unit (18); and
    a receiving unit (21, 121) configured for receiving the activation signal (15) from outside the protective garment (10, 110) and generating the triggering signal of the inflator device (14) in event of the activation signal (15) being recognized as such by the receiving unit.

2. The protective garment (10, 110) according to claim 1, characterized in that the transmitting unit (20, 120) and the receiving unit (21, 121) are a wireless transmitting unit and a wireless receiving unit, respectively.

3. The protective garment (10, 110) according to claim 2, characterized in that the wireless transmitting unit (20, 120) and the wireless receiving unit (21, 121) are configured for respectively sending outside the protective garment (10, 110) and for receiving from outside the protective garment (10, 110), the activation signal (15) by means of wireless communication protocol.

4. The protective garment (10, 110) according to claim 1, characterized in that the transmitting unit (20, 120) and the receiving unit (21, 121) are configured for respectively sending outside the protective garment (10, 110) and for receiving from outside the protective garment (10, 110), the activation signal (15) through a wired communication link.

5. The protective garment (10, 110) according to claim 1, characterized in that the transmitting unit (20, 120) and the receiving unit (21, 121) are each supplied as a separate component of the control unit (18).

6. The protective garment (10, 110) according to claim 5, characterized in that the transmitting unit (20, 120) and the receiving unit (21, 121) are incorporated in an expansion board (22), the expansion board (22) configured for being inserted in a seat provided in the control unit (18).

7. The protective garment (10, 110) according to claim 1, further comprising a storage memory configured for storing an identification code and in that the transmitting unit (20, 120) is configured for sending in the activation signal the identification code from the storage memory.

8. The protective garment (10, 110) according to claim 1, further comprising a storage memory configured for storing an identification code and in that the receiving unit (21, 121) is configured for recognizing the activation signal as such by the activation signal containing the identification code from the storage memory.

9. The protective garment (10, 110) according to claim 1, further comprising a display (6), the display (6) configured to provide information about status of the inflatable protective device of the protective garment (10, 110).

10. The protective garment (10, 110) according to claim 1, characterized in that the protective garment (10, 110) is paired with a second protective garment (10, 110).

11. The protective garment (10, 110) according to claim 10, characterized in that the protective garment (10, 110) is paired with a receiving unit (36) provided on a motorcycle used by a user of the protective garment (10, 110).

12. The protective garment (10, 110) according to claim 11, characterized in that the receiving unit (36) is positioned on a dashboard of the motorcycle.

13. The protective garment (10, 110) according to claim 11, characterized in that said receiving unit (36) is a display configured for showing diagnostic information about the protective garment (10, 110).

14. A method for inflating an inflatable protective device (12) of a protective garment (10, 110), the method comprising the following steps:
    detecting the acceleration undergone by the protective garment (10, 110);
    processing, for identifying a dangerous situation for the user of the protective garment (10, 110), the detected acceleration data;
    generating a triggering signal when a dangerous situation has been identified so as to inflate the inflatable protective device (12) of the protective garment (10, 110);
    the method further comprising the following steps:
        sending an activation signal outside the protective garment (10, 110) when the triggering signal is generated; and
        automatically monitoring signals received from outside the protective garment (10, 110) for generating a triggering signal of the inflatable protective device (12) when an activation signal is received.

15. The method according to claim 14, further comprising the step of providing the protective garment (10, 110) with an identification code.

16. The method according to claim 15, wherein the triggering signal is generated only if the signal received from outside the protective garment (10, 110) is compatible with the identification code of the protective garment (10, 110).

17. The method according to claim 14, further comprising the step of pairing the protective garment (10, 110) with a further protective garment (10, 110).

18. The method according to claim 14, further comprising the step of detecting the acceleration undergone by a vehicle on which the user of the protective garment (10, 110) is mounted and/or further comprising the step of detecting, for identifying a dangerous situation, also the acceleration data of said vehicle, in addition to the acceleration data of the protective garment (10, 110).

* * * * *